United States Patent [19]

Webb et al.

[11] Patent Number: 4,614,857

[45] Date of Patent: Sep. 30, 1986

[54] SOLENOID ENERGIZING CIRCUIT FOR AN ELECTRIC ARC WELDING TOOL

[76] Inventors: Stephen Webb, 73 Maltravers St., Arundel, West Sussex BN18 9BQ; Roy Neville, The Pebbles, Green La., Ellisfield, near Basingstoke, Hampshire RG25 2NS, both of England

[21] Appl. No.: 699,471

[22] Filed: Feb. 8, 1985

[30] Foreign Application Priority Data

Jan. 29, 1985 [GB] United Kingdom ............... 8502192

[51] Int. Cl.⁴ .............................................. B23K 9/30
[52] U.S. Cl. .................................................. 219/136
[58] Field of Search ................ 219/98, 99, 136, 69 V

[56] References Cited

U.S. PATENT DOCUMENTS 3,089,946  5/1963  Kastler et al. ..................... 219/98
3,496,325  2/1970  Glorioso .......................... 219/98
4,178,495 12/1979  Spisak et al. ..................... 219/98

FOREIGN PATENT DOCUMENTS 2108417  5/1983  United Kingdom .

Primary Examiner—Clifford C. Shaw
Attorney, Agent, or Firm—Banner, Birch, McKie & Beckett

[57] ABSTRACT

A vibrating electrode electric arc welding tool for low currents particularly for use on thin gauge metal has a solenoid with a fixed core and a moving core spaced therefrom by an air gap. The moving core holds the electrode and the solenoid winding is in series connection with the current feed to the electrode. When the current increases due to contact between the electrode and work the moving core is attracted to the fixed core to break the connection and re-establish the arc. The tool further includes a diode in series with the current feed, the diode provides better control of the arc and enables lighter gauge metals to be welded.

8 Claims, 3 Drawing Figures

SOLENOID ENERGIZING CIRCUIT FOR AN ELECTRIC ARC WELDING TOOL

This invention relates to an improved electric arc welding tool, such as that described in G.B. 996126 which operates to strike an arc and maintain a succession of arcs to enable efficient welding operation to be performed without a high degree of skill from an operator. In such a tool a sustained heavy current drain is avoided and the tool is suitable for use on low voltage supplies where difficulty would otherwise be experienced in rapidly striking and maintaining an arc.

The known constructions of tool have an electromagnetic means arranged to retract an electrode holder in opposition to a restoring means such as a spring, which urges the holder towards the workpiece, the solenoid means having an energising circuit which is completed through the electrode and workpiece by mutual contact of these whereby the electrode will be retracted to strike an arc and break the circuit, the restoring means returning the electrode to make contact with the workpiece, resulting in a succession of arcs between the electrode and workpiece.

The electro-magnetic means is a solenoid having a core arranged to move and in electrical connection with the electrode holder; the core is an electrical contact throughout the whole of its movement with the electric current feed to the tool. The energising current for the solenoid is provided by a winding through which the current to the tool is fed. In such an arrangement it is difficult to arrive at the correct balance between coil winding and current. Welding thick metals requires high current with a coil of heavy gauge wire and few turns, whereas light gauge welding using low current needs a coil with a large number of turns and thinner gauge wire. The resulting tool to a large extent is therefore a compromise with the heavy wire wound tool unsuitable for light work and the thin wire wound tool unsuitable for heavy work. It was not possible hitherto to provide a single tool for the commonly used current range 15 to 150 Amps.

It is an object of this invention to provide an improved construction for the solenoid of such a welding tool in which a wider range of currents can be used but with a single solenoid winding.

It is a further object to provide a welding tool wherein the arc can be maintained at much lower currents than hitherto. Yet a further object is to provide a welding tool capable of operating on thin gauge metals and especially stainless steels without burning through the metal sheet.

According to this invention there is provided an improvement in a welding tool having an electro-magnetic solenoid means arranged to retract an electrode holder in opposition to a restoring means which urges the holder towards the workpiece, the solenoid means having an energising circuit which is completed through the electrode and workpiece by mutual contact of these whereby the electrode will be retracted to strike an arc and break the circuit, the restoring means returning the electrode to make contact with the workpiece, wherein as a first improvement the solenoid includes a core of magnetic material with a first part fixed to the solenoid coil structure and a second part fixed to the electrode holder and movable with respect to the solenoid, the first and second parts being spaced longitudinally by an air gap, and wherein as a second improvement a diode is included in series with the current feed from the said energising circuit.

It has been found surprisingly that the diode results in a considerably improved performance when welding thin materials and has the effect of reducing current fed from a transformer comprising the energising source. In most transformer supplies even though set to 30 amp range, the actual current is usually nearer 50 amps resulting in destruction of the metal weld. The diode does not simply act to reduce current as we have found that there is an unexpected interaction with our air-gap solenoid arrangement and we believe the natural vibration period in conjunction with the half-wave supply produces the surprising and beneficial welding effect. The enhancement is not noticed with a conventional weld head nor with the head disclosed in GB 996126. Thus the discovery in the instant invention resides in the combination of weld head solenoid having an air gap and diode arrangement.

The air gap is preferably positioned within the solenoid structure and with this arrangement the fixed core part ensures adequate magnetic flux when low currents are used to provide sufficient attraction.

The second core part may be electrically connected with the energising circuit through a flexible electric connection, and preferably the second core part has an extension passing through the solenoid core and secured to one end of the flexible electrical connection. The extension will advantageously pass, with clearance, through a boring in the first core part.

The construction according to this invention enables the minimum number of turns to be used which reduces manufacturing costs and gives a lower coil resistance and hence less heating. The increased efficiency allows tools built to carry heavy currents to be usable and efficient at low currents when magnetism is weak.

The solenoid will preferably be mounted on a weld head handle to form a tool. The base of the handle may be provided with a recess into which the diode is inserted and retained by a collar or abutment secured to the handle wall. One pole of the diode electrically contacts the handle which may be of metal, e.g. diecast alloys, the other pole is constituted by a leadout which connects at a terminal with the feed cable. The terminal being electrically insulated from the handle with a switch, such as a shorting screw, provided to by-pass the diode.

The handle thus serves as a mount providing protection for the diode and heat sinking properties.

The diode should have forward current capability in excess of the max current surge and a reverse breakdown characteristic to take into account any inductively induced spikes which may occur.

The metal handle of the tool is enclosed in a rubber or plastics hand-grip.

An embodiment according to the invention is shown by way of example only in the accompanying drawings which show a welding tool head, other parts such as the transformer and weld rods being omitted. In the drawings.

Figure 3:
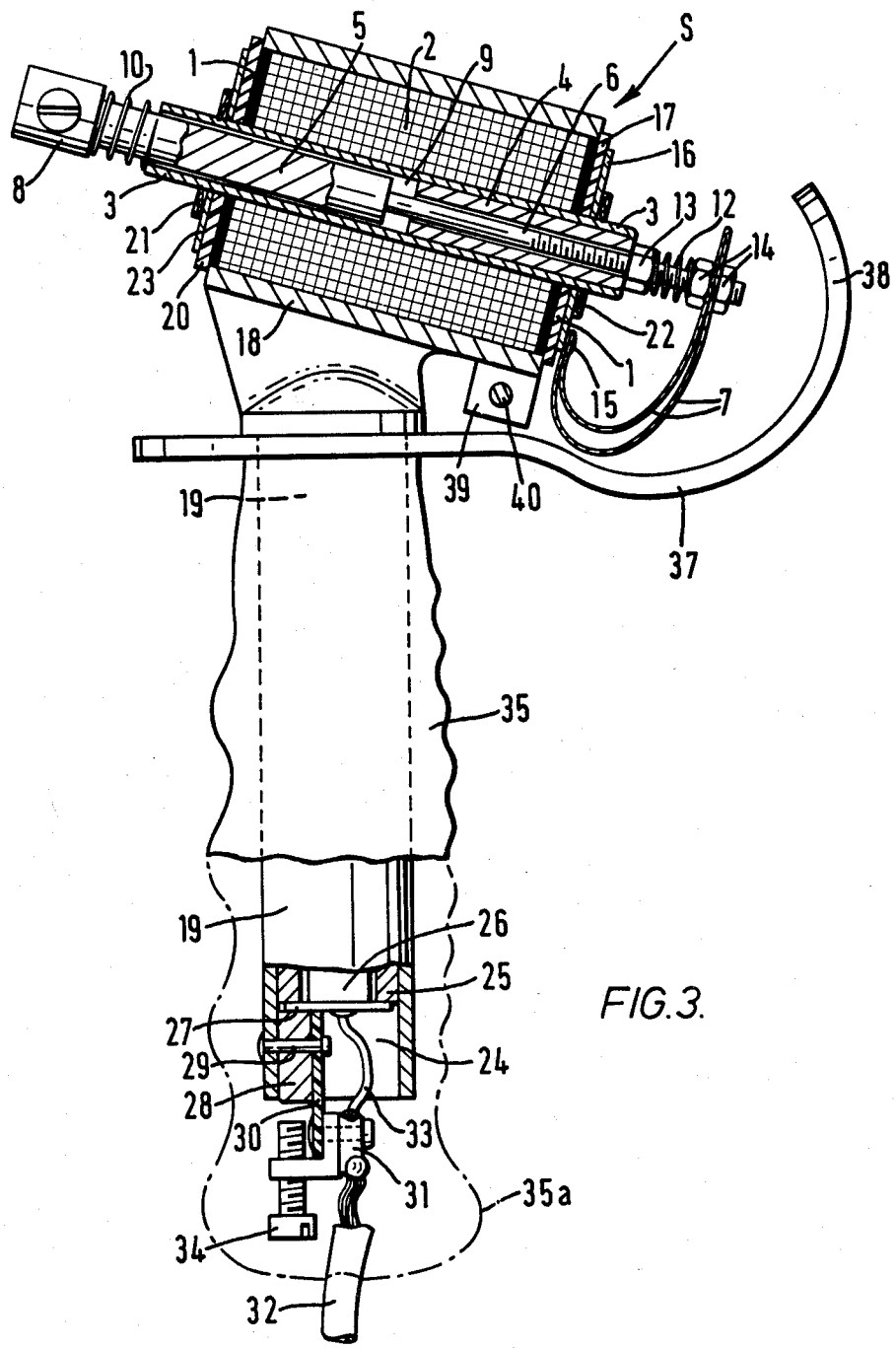
FIG. 3 shows the tool in side view and partly in section.

Referring mainly to FIG. 3 of the drawings, the tool has a solenoid structure S which comprises a body 1 wound with a coil of wire 2 about a central hollow core 3. The core contains a first fixed iron core part 4 and a second movable iron core part 5. The core part 5 has a threaded brass studding 6 connected thereto and which passes with clearance through a boring in the core part 4 to connect with conducting leaves 7 serving as a mechanically flexible electric current feed to the welding tool holder 8 via the studding 6 and core part 5. The studding is adjustable by means of a nut 13 and provides an air gap 9 between the two iron core parts. By this means magnetic attraction is increased at lower weld currents. The tool holder 8 and core part 5 are normally urged away from the core part 4 by a return spring 10 and the tension in this spring will be increased when the studding 6 is adjusted by nut 13 to close the gap 9. The leaves 7 are secured to the studding by lock nuts 14 and to the body 1 by rivet or solder 15. The rivet or solder joint 15 electrically connects the leaves 7 with one end of the solenoid coil 2 by a metal plate 16 insulated from the coil body by a fibre washer 17. The other end of the coil 2 connects with a diecast housing 18 contiguous with a tubular handle 19.

The other end of the solenoid has an insulating fibre washer 20 and plate 23 and the assembly including core 3 is retained by press-fitted diaphragm spring clips 21,22 The tool may be arranged as a self-striking, arc-restoring static electrode holder. If a weak return spring 10 is used, then welding current passing through the coil will hold the two iron cores 4 and 5 together solidly. In this form the role is as a static electrode holder. Should the arc break the electrode will move forward to make electrical contact and then draw away thus restoring the arc.

Although the known prior art tool has such qualities the electrode tends to float about and to some operators this is undesirable. In the invention herein the tool becomes truly static during the actual welding process.

Figure 1:
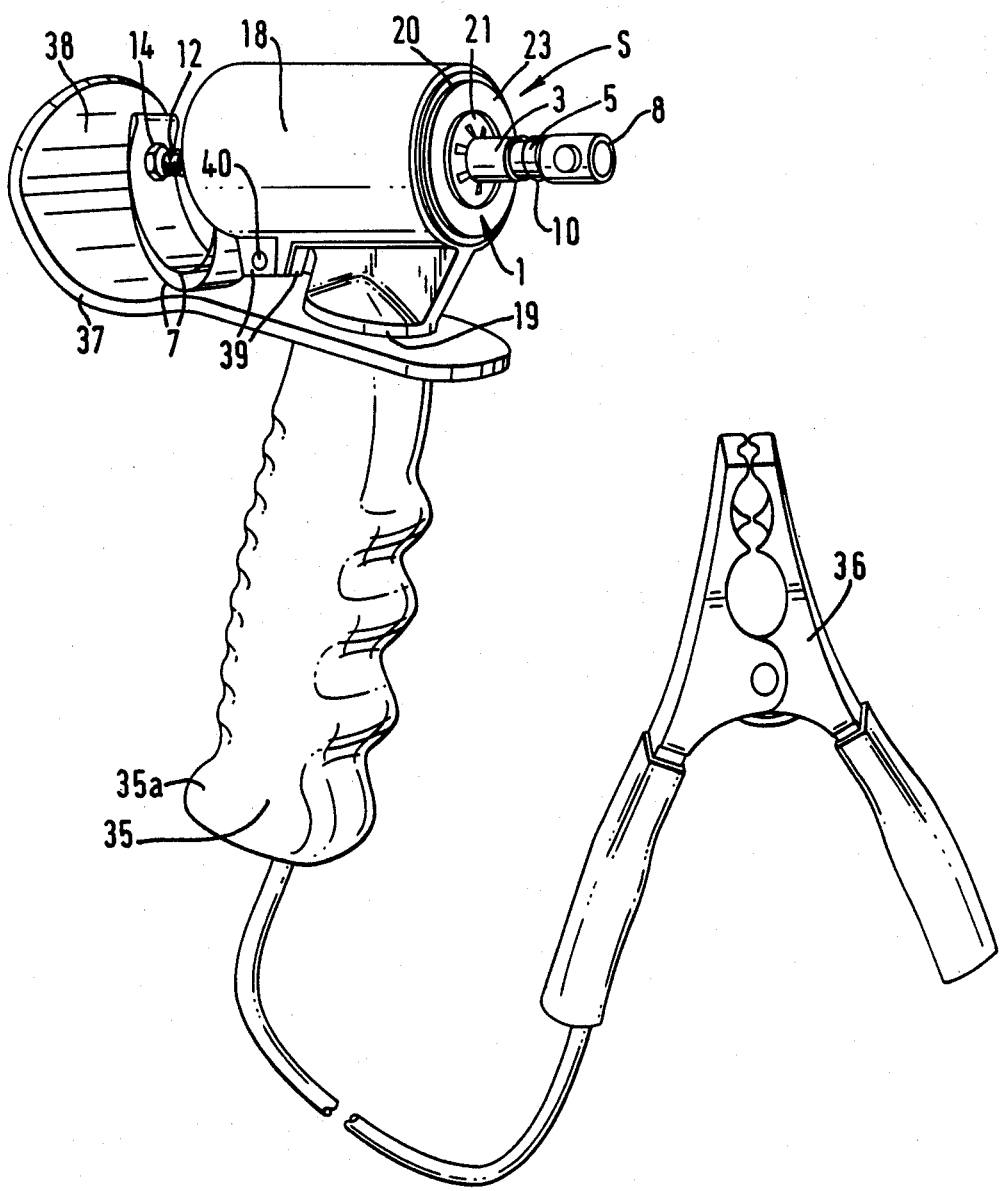
FIG. 1 shows a weld tool in perspective view.
Figure 2:
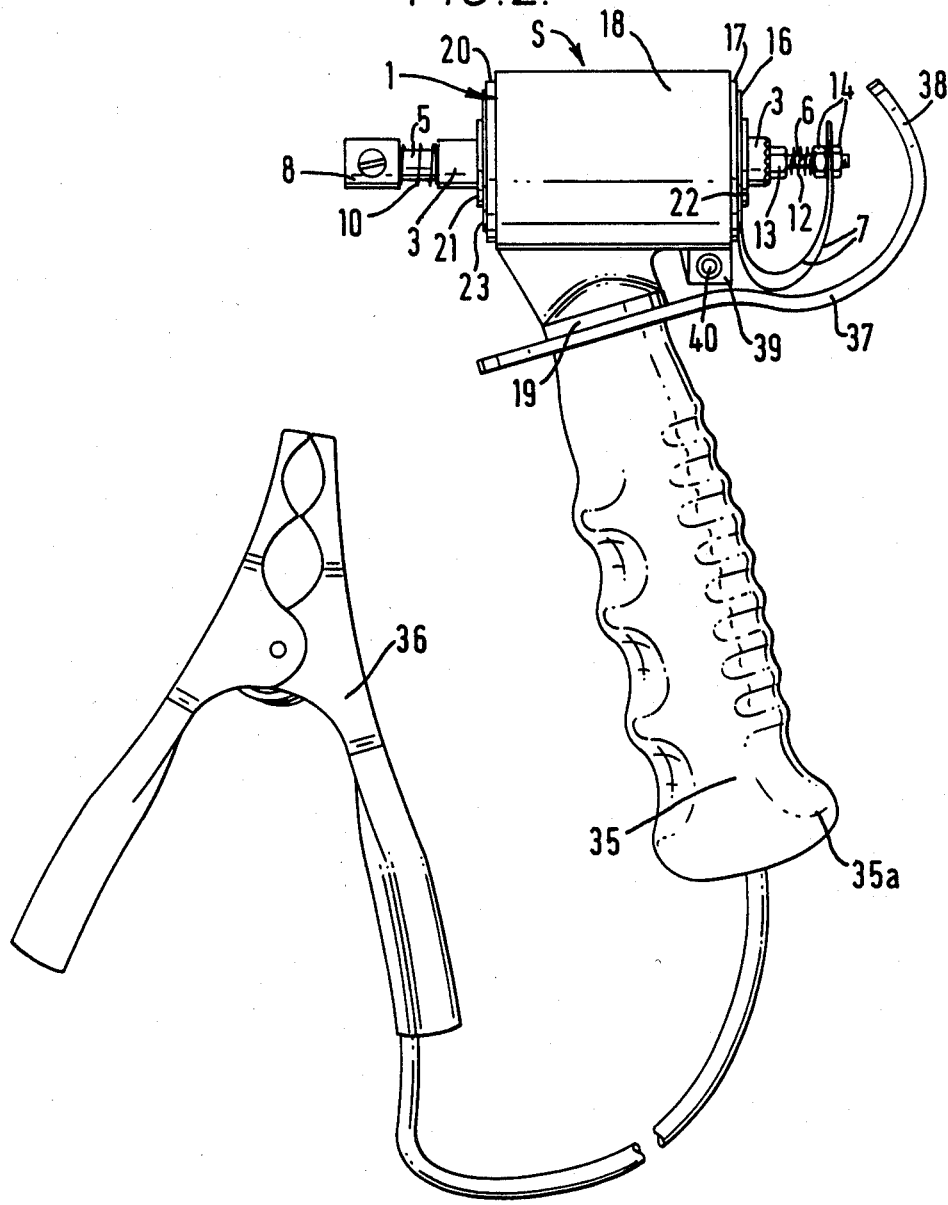
FIG. 2 shows the weld tool in side view.

The nut 13 provides for a simple means of adjustment of the air gap 9 whilst a spring 12 provides tension sufficient to lock the nut 13 and prevent movement during use. This adjustment which allows the operator to easily find the optimum setting for given welding electrodes, metals, thicknesses, currents and voltages. FIGS. 1 and 2 show the general construction which comprises a single die-cast body comprising a hollow cylindrical head housing 18 and integral cylindrical handle 19. The solenoid body is retained in the head 18 by the fibre washers 17,20, metal plates 16,23 and spring clip washers 21,22 also serving to trap the core 3 and hold same in position. One end of the solenoid winding connects at 15 with the leaves 7, the other end of the winding connects to body 18,19, by clamping between two lugs 39 forced together by rivet or screw means 40.

The base of the handle 19 is bored at 24 and has shoulder 25. A diode 26 of "top-hat" shape is received in the bore and the rim 27 thereof bears on shoulder 25 and is clamped by an insert 28 retained by rivet 29.

An insulating plate 30 is also clamped by the rivet 29 and this plate carries a terminal block 31 to which the current feed cable 32 is bonded, along with lead in 33 to diode 26. A screw 34 may be adjusted to bridge the diode if same is not required in circuit.

The electrical circuit is thus: from a transformer supply (not shown) through cable 32 to terminal 31 thence via lead 33 through the diode 26 to the casing thereof which is in electrical connection with handle 19. Current passes then to housing 18 through the solenoid winding 2 to connection 15 via leaves 7, studding 6, core part 5 and tool-holder 8 via the weld rod (not shown) to the workpiece which is electrically connected to the other side of the transformer.

The cable 32 preferably has a clip 36 at the remote end to connect with the transformer. The handle 19 is provided with a rubber hand grip 35 slide thereover.

In this invention the combination of air-gapped moving core solenoid and the series diode provides a low current welding capability which hitherto has been impossible to achieve, there normally being insufficient current to maintain an arc or if the current is sufficient the arc cannot be controlled to provide a weld without the well known problem of melting a hole in the workpiece.

A rigid plastic guard 37 also serves as a stand wherein the part 38 thereof may rest on a surface together with heel 35a of the handle.

We claim:

1. An improvement in a welding tool having an electromagnetic solenoid means arranged to retract an electrode holder in opposition to a restoring means which urges the holder towards the workpiece, the solenoid means having an alternating current energising circuit which is completed through the electrode and workpiece by mutual contact of these whereby the electrode will be repeatedly retracted to strike an arc and break the circuit, the restoring means repeatedly returning the electrode to make contact with the workpiece, wherein as a first improvement the solenoid includes a core of magnetic material with a first part fixed to the solenoid coil structure and a second part fixed to the electrode holder and movable with respect to the solenoid, the first and second parts being spaced longitudinally by an air gap of variable length, and wherein as a second improvement a diode is included in series with the current feed from the said energising circuit to half-wave-rectify the current feed.

2. A welding tool as claimed in claim 1, wherein the solenoid assembly is mounted in a housing integrally connected with a handle, the diode being mounted within the handle, one pole of the diode being in electrical contact with one end of the solenoid winding, the other pole of the diode being connected to a terminal to which a cable is secured serving to feed current to the tool, the other end of the solenoid winding being in electrical contact with one end of a flexible electrical connection, the other end of said connection being secured to the second core part which is fixed to the electrode holder.

3. A welding tool as claimed in claim 2, wherein the said housing and handle comprise a metal, the diode having the said one pole connected electrically to the handle, the solenoid having the said one end connected to the housing thereby forming the electrical connection between the solenoid and diode.

4. A welding tool as claimed in claim 3, wherein the handle has a bore in the end thereof remote from the housing, the bore having a shoulder and receiving the body of the diode with a flange portion thereof in abutment with said shoulder, securing means engaging said flange to press same firmly against the shoulder to provide an electrically conductive connection.

5. A welding tool as claimed in claim 3, wherein said one end of the solenoid coil lies between two lugs on the housing, the lugs being compressed together to secure the coil end and establish electrical connection between said one end of the coil and the housing.

6. A welding tool as claimed in claim 2, wherein the handle is cylindrical a moulded rubber hand-grip being provided to slide over said handle, the hand grip base having formed therein a grommet through which the current cable is secured.

7. A welding tool as claimed in claim 2, wherein a hand guard is positioned between the handle and housing, the guard comprising a sheet material having an arcuately curved portion formed to extend over and around the end of the solenoid and housing remote from the electrode holder.

8. An improvement in a welding tool having an electromagnetic solenoid means arranged to retract an electrode holder in opposition to a restoring means which urges the holder towards the workpiece, the solenoid means having an energising circuit which is completed through the electrode and workpiece by mutual contact of these whereby the electrode will be retracted to strike an arc and break the circuit, the restoring means returning the electrode to make contact with the workpiece, wherein as a first improvement the solenoid includes a core of magnetic material with a first part fixed to the solenoid coil structure and a second part fixed to the electrode holder and movable with respect to the solenoid, the first and second parts being spaced longitudinally by a air gap of variable length, and wherein as a second improvement a diode is included in series with the current feed from the said energising circuit, wherein the solenoid assembly is mounted in a housing integrally connected with a handle, the diode being mounted within the handle, one pole of the diode being in electrical contact with one end of the solenoid winding, the other pole of the diode being connected to a terminal to which a cable is secured serving to feed current to the tool, the other end of the solenoid winding being in electrical contact with one end of a flexible electrical connection, the other end of said connection being secured to the second core part which is fixed to the electrode holder, and wherein the housing is cylindrical the solenoid coil being located within the housing, the said coil having a central hollow core protruding from each end of the housing, the core containing a fixed first core part at one end, said core part having a central boring through which a studding passes with clearance, said studding being integral with one end of the second movable core part at the other end of the hollow core, the second core part being spaced from the first by an air gap, the second core part having at its other end the electrode holder, the solenoid coil being retained in the housing by metal plates positioned over the hollow core and each in abutment with a respective end face of the housing and coil, the metal plates each being secured by a spring clip means each engaging and gripping the hollow core and pressing against the metal plates through an interposed insulating washer so that the hollow core is electrically insulated from the housing.

* * * * *